Patented Aug. 14, 1951

2,564,131

UNITED STATES PATENT OFFICE 2,564,131

CYANO ALDEHYDE COMPOUND

Ralph C. Schreyer, Wilmington, Del., assignor to E. I. du Pont de Nemours and Company, Wilmington, Del., a corporation of Delaware No Drawing. Application November 8, 1950, Serial No. 194,725

1 Claim. (Cl. 260—465.1)

This invention relates to a new cyano aldehyde compound which is particularly useful for the preparation of a wide variety of difunctional compounds.

In accordance with this invention, there is provided the novel compound, 6-cyano-3-methylhexanal, having the formula

This novel cyano aldehyde is a liquid, boiling at 115° C. to 120° C. at a pressure of 4-5 mm. and having a refractiove index, $n_D^{25}=1.4412$.

This compound may be converted into a wide variety of other new and important difunctional compounds. For instance, the cyano group can be hydrolyzed to yield a carboxylic acid group and the resulting aldehyde-acid can be oxidized to yield a dibasic acid, namely, 3-methylpimelic acid. Alternately, the novel cyano aldehyde of this invention may be subjected to reductive amination, whereby the novel and important compound, 3-methylheptamethylenediamine, is produced. As another alternative, the cyano aldehyde may be subjected to oxidation, using air or other known oxidizing agents, to produce the corresponding cyano acid, which can be hydrolyzed, in turn, to yield 3-methylpimelic acid. By hydrogenation of the cyano aldehyde, the corresponding cyano alcohol is obtained, which can be converted by reduction into the amino alcohol, 3-methyl-7-amino-heptanol.

The cyano aldehyde compound of this invention maybe be prepared in a number of different ways. One of the most convenient methods involves the reaction of 5-methyl-5-hexenenitrile with carbon monoxide and hydrogen at elevated temperatures and pressures in the presence of a catalyst such as cobalt. A small amount of the isomeric 5-cyano-2,2-dimethylpentanal is also obtained in this process. The 5-methyl-5-hexenenitrile used as a starting material is obtained in good yield as the adduct of acrylonitrile and isobutylene. If the hydrocarbonylation of the 5-methyl-5-hexenenitrile is carried out at temperatures which are in general higher than those employed in preparing 6-cyano-3-methylhexanal, then the cyano alcohol, 6-cyano-3-methylhexanol, can be obtained directly.

The preparation, properties, and reactions of this novel cyano aldehyde are illustrated in the following examples.

EXAMPLE 1

*Preparation of 5-methyl-5-hexenenitrile*

One hundred forty grams of isobutylene and 60 grams of acrylonitrile (mol ratio=2.5:1) was processed in a shaker tube containing 1 gram of hydroquinone for one hour at a temperature of 275° C. 5-methyl-5-hexenenitrile, boiling point 181° C. to 184° C., boiling point at 4 mm., 48° C. to 50° C., $n_D^{25}=1.4330$, was obtained in 58% conversion based on the acrylonitrile present.

EXAMPLE 2

*Preparation of 5-methyl-5-hexenenitrile*

One hundred fifty grams of isobutylene, 60 grams of acrylonitrile, and 1 gram of hydroquinone was heated in a 325 cc. stainless steel autoclave at 200° C. to 234° C. for four hours. During this period the pressure dropped from 1000 atm. to 520 atm. The product was then discharged and distilled under vacuum to give 55 grams of 5-methyl-5-hexenenitrile, boiling point (0.8-1.5 mm.) 39° C. to 44° C., $n_D^{25}=1.4331$.

EXAMPLE 3

*Preparation of 6-cyano-3-methylhexanal*

A charge of 42.5 grams of 5-methyl-5-hexenenitrile, 150 cc. of diethyl ether, and 5 grams reduced cobalt oxide catalyst was processed with a 1:1 gas mixture of carbon monoxide and hydrogen at 150° C. to 175° C. and 700 atmospheres pressure for 1.5 hours in a stainless steel shaker tube. Four such runs were made and the combined products distilled to give the following fractions: (1) ether, (2) 39.6 grams, boiling point 35° C. to 42° C. (1 mm.) (mixture of saturated and unsaturated nitrile), (3) 6.5 grams, boiling point 45° C. to 110° C. (2-5 mm.), and (4) 90.8 grams of 6 - cyano - 3 - methylhexanal, boiling point 115° C. to 120° C. (4-5 mm.), $n_D^{25}=1.4412$ (42% conversion). Analysis-Calculated for $C_8H_{13}NO$: C, 69.05; H, 9.35; N, 10.08; Found: C, 68.46; H, 9.29; N, 9.89. The 2,4-dinitrophenyl-hydrazone of the cyano aldehyde was an oil but the dimedone melted at 118° C.

EXAMPLE 4

*Preparation of 6-cyano-3-methylhexanal*

Forty grams of 5-methyl-5-hexenenitrile, 150 cc. of ethyl ether, and 5 grams of reduced cobalt oxide catalyst was processed in a stainless steel tube at 150° C. to 175° C. and 700 atmospheres pressure with a 1CO:1H₂ gas for 1½ hours. The product was discharged and distilled to give 10 grams of the saturated nitrile, boiling point (0.7-1 mm.), 35° C. to 42° C., $n_D^{25}=1.4211$, and 23 grams of 6-cyano-3-methylhexanal, boiling point (4-5 mm.) 115° C. to 120° C., $n_D^{25}=1.4412$.

EXAMPLE 5

*Preparation of 6-cyano-3-methylhexanol*

A charge of 50 grams of 5-methyl-5-hexenitrile, 100 cc. of ethyl ether and 10 grams of reduced cobalt oxide catalyst was processed with a gas mixture of 1CO:1H₂ at 239° C. to 260° C. and 700 atmospheres pressure for one hour in a stainless steel shaker tube. Distillation of the product gave (1) 10.3 grams, boiling point 40° C. to 110° C. (2–3 mm.), $n_D^{26}$=1.4150, and 23.5 grams of 6-cyano-3-methylhexanol boiling point 110° C. to 120° C. (2–2.5 mm.), $n_D^{26}$=1.4483, the desired cyanoalcohol. Analysis-Calculated for C$_8$H$_{15}$NO: N, 9.91; OH#, 395; Found: N, 9.56; OH#, 366.

EXAMPLE 6

*Preparation of 3-methylheptamethylenediamine*

A charge of 45 grams of 6-cyano-3-methylhexanal, 119 grams of ammonia and 10 grams of reduced cobalt oxide catalyst was processed with hydrogen at 160° C. to 170° C. and 700 atmospheres pressure for one hour in a stainless steel shaker tube. Distillation of the products from three such runs after evaporation of the ammonia gave the following cuts: (1) 2.4 grams, boiling point 45° C. to 50° C. (0.5–0.7 mm.) and (2) 83.6 grams of 3-methylheptamethylenediamine, boiling point 53° C. to 60° C. (0.4–0.6 mm.), $n_D^{23}$=1.4601. Analysis-Calculated for C$_8$H$_{20}$N$_2$: C, 66.5; H, 13.87; N, 19.45; neutral equivalent, 72; Found: C, 64.78; H, 13.65; N, 19.30; neutral equivalent, 73.

EXAMPLE 7

*Preparation of 3-methylheptamethylenediamine*

Thirty-five grams of 6-cyano-3-methylhexanal, 119 grams NH$_3$ and 10 grams reduced cobalt oxide catalyst was hydrogenated at 150° C. to 163° C. and 700 atmospheres pressures for one hour. The product was discharged and distilled to give 18 grams of 3-methylheptamethylenediamine, boiling point (0.6–0.7 mm.), 60° C. to 61° C., $n_D^{25}$=1.4589. A 12 gram heel remained.

EXAMPLE 8

*Preparation of 6-cyano-3-methylhexanoic acid*

Air was passed through a disparger into 45 grams of 6-cyano-3-methylhexanal for 12 hours. The reaction was very exothermic during the first 2 hours and was kept below 60° C. by cooling. Distillation of the product gave (1) 15 grams, boiling point 98° C. to 105° C. (1–2 mm.), $n_D^{25}$=1.4395, starting material and (2) 19.5 grams of 6-cyano-3-methylhexanoic acid, boiling point 130° C. to 140° C. (1–2 mm.), $n_D^{25}$=1.4508, the desired cyanoacid. Analysis-Calculated for C$_8$H$_{13}$O$_2$N: N, 9.03; acid #, 361; Found: N, 8.89; acid #, 338.

EXAMPLE 9

*Preparation of 3-methylpimelic acid*

A charge of 15.7 grams of 6-cyano-3-methylhexanoic acid and 200 cc. of concentrated HCl was refluxed for 8 hours. The mixture was then extracted with diethyl ether three times and the ether extract dried over anhydrous magnesium sulfate. Distillation gave ether and 9 grams of 3-methylpimelic acid, a viscous, pale yellow liquid, boiling point, 190° C. to 195° C. (5 mm.), the desired dibasic acid. Analysis-Calculated for C$_8$H$_{14}$O$_4$: C, 55.1; H, 8.04; neutral equivalent, 87; Found: C, 54.52; H, 8.10; neutral equivalent, 88.

EXAMPLE 10

*Preparation of 3-methyl-7-aminoheptanol*

A charge of 34 grams of 6-cyano-3-methylhexanol, 102 grams of ammonia, and 10 grams of Raney nickel was processed with hydrogen at 125° C. to 135° C. and 700 atmospheres pressure for one hour in a stainless steel shaker tube. Distillation of the product gave (1) 0.5 grams, boiling point 100° C. to 117° C. (4.5 mm.), and 17 grams of 3-methyl-7-aminoheptanol, boiling point 120° C. to 122° C. (4.5–5 mm.), $n_D^{26.5}$=1.4628, the desired aminoalcohol. Analysis-Calculated for C$_8$H$_{19}$NO: N, 9.66; neutral equivalent, 145; OH#, 386; Found: N, 9.69; neutral equivalent, 147; OH#, 374.

The novel compound, 6-cyano-3-methylhexanal, constitutes an important advance in the art because it provides for the first time a practical intermediate for the preparation of important difunctional compounds, notably, 3-methylheptamethylenediamine and 3-methylpimelic acid. These and other derivatives of 6-cyano-3-methylhexanal have great value in connection with the preparation of synthetic linear polyamides and polyester-amides, as well as having many other uses which will be apparent to those skilled in the art.

I claim:

The compound, 6-cyano-3-methylhexanal having the formula

CN·CH$_2$·CH$_2$·CH$_2$·CH(CH$_3$)·CH$_2$·CHO boiling at about 115° C. to 120° C. at a pressure of 4 to 5 mm.

RALPH C. SCHREYER.

No references cited.